Dec. 11, 1945.   R. A. GEISELMAN   2,390,786
REGULATING SYSTEM
Filed Dec. 8, 1942

WITNESSES:

INVENTOR
Ralph A. Geiselman.
BY
James N. Ely
ATTORNEY

Patented Dec. 11, 1945

2,390,786

UNITED STATES PATENT OFFICE 2,390,786

REGULATING SYSTEM

Ralph A. Geiselman, Wilkinsburg, Pa., assignor to Westinghouse Electric Corporation, East Pittsburgh, Pa., a corporation of Pennsylvania Application December 8, 1942, Serial No. 468,215

5 Claims. (Cl. 171—119)

This invention relates to electrical systems and, in particular, to regulating or limiting systems for synchronous condensers.

In electrical systems which utilize synchronous condensers connected to a power circuit, it has been quite difficult to provide satisfactory regulation of the synchronous condenser. Many different regulating systems have been developed for maintaining the voltage of such dynamo-electric machines substantially constant. Likewise systems based on the regulation of current have also been developed. All the systems, however, are not satisfactory, and in particular, the current regulating system, since the voltage may fluctuate regardless of the current regulation. Further, since the synchronous condenser is rated in kva., it is preferred to provide for regulating or limiting the kva. output of the machine.

It is an object of this invention to provide a system responsive to changes in kva. for regulating or limiting the kva. of a synchronous condenser.

Figure 1:
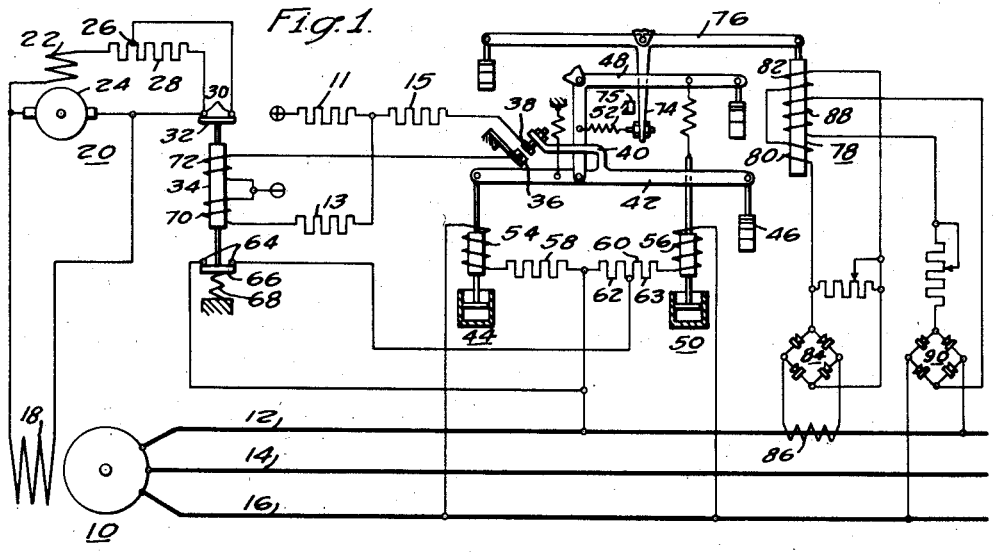
Figure 2:
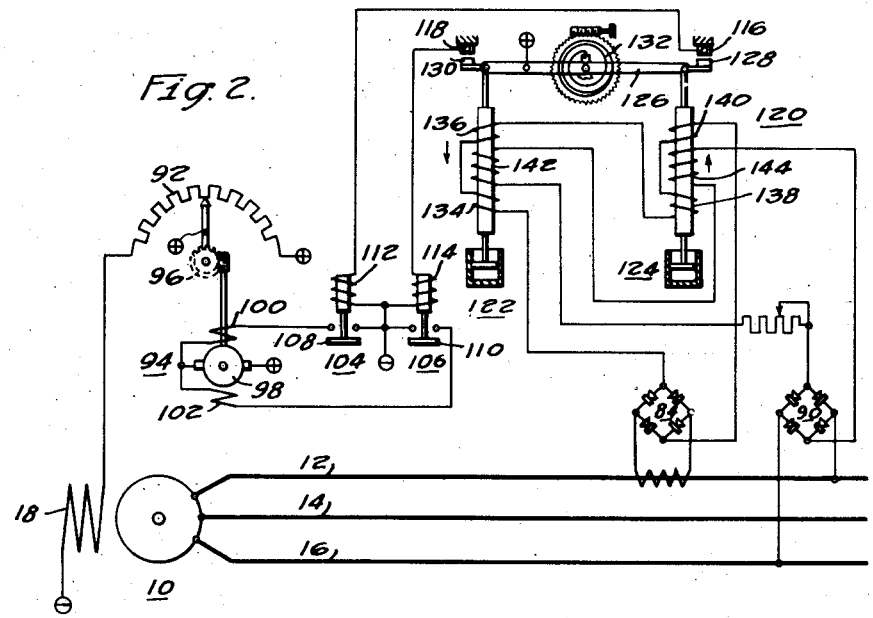

Other objects of this invention will become apparent from the following description when taken in conjunction with the accompanying drawing, in which:

Figure 1 is a diagrammatic view of an embodiment of this invention for limiting the kva. of a synchronous condenser; and Fig. 2 is a diagrammatic view of a kva. regulating system for synchronous condensers.

Referring to Fig. 1, a synchronous condenser 10 is connected to conductors 12, 14, and 16 of a three-phase power circuit and is provided with a field winding 18 that is connected to an exciter generator 20. The exciter generator 20 is provided with a field winding 22 that is connected to be energized from the armature 24 of the exciter, a sectional resistor 26 being connected in circuit therewith.

The section 28 of the resistor 26 is disposed to be shunted through the contact members 30 and 32 of a relay 34 which is operated in accordance with the operation of the regulator contact members 36 and 38. The contact member 38 is carried by an arm 40 of a bell crank lever 42 and is operated in accordance with the pull of a control electromagnet 44 that is balanced by the weight 46. The lever 42 is pivotally mounted upon the lower arm of a bell crank 48 which is connected to be actuated in accordance with the operation of an anti-hunting electromagnet 50 against the pull of the spring tension member 52.

The electromagnets 44 and 50 are provided with windings 54 and 56, respectively, connected through resistors 58 and 60, respectively, to be energized in accordance with the voltage of the power circuit 12, 14, and 16. A section 62 of the resistor 60 connected in circuit with the winding 56 of the anti-hunting electromagnet 50 is disposed to be shunted through the contact members 64 and 66 of the relay 34.

The relay 34 illustrated is biased upwardly by the spring 68 and is provided with a main energizing winding 70 and a neutralizing winding 72, the winding 70 being connected at all times to a suitable source of power, (not shown), whereas the winding 72 is disposed to be connected to the same power source only upon engagement of the contact members 36 and 38. The operation of the contact members 36 and 38 is primarily controlled by the electromagnets 44 and 50.

The spring tension member 52 referred to hereinbefore is also connected to a depending arm 74 of a T-shaped lever 76 that is disposed to be actuated in accordance with the operation of the electromagnet 78. A stop 75 is disposed in the path of movement of arm 74 to limit the movement of the lever 76 in the one direction. The electromagnet 78 is of well known construction as shown and described in Patent No. 1,565,410, issued December 15, 1925, to C. A. Boddie, being provided with two series connected windings 80 and 82 that are connected through the rectifier 84 to a current transformer 86 associated with the power conductor 12 and a winding 88 connected through the rectifier 90 to conductors 12 and 16 of the power circuit. The electromagnet 78 is, therefore, by reason of the rectifiers 84 and 90, disposed to be energized in accordance with the kva. of the power circuit.

In operation, the excitation of the synchronous condenser 10 is controlled in accordance with the load supplied by the conductors 12, 14 and 16. For normal operation, the synchronous condenser 10 is regulated to maintain constant voltage. However, where the load is such that a lagging current is encountered, then the synchronous condenser 10 is overexcited to take a corresponding high value of leading current. Since synchronous condensers are usually rated in kva., the operation of the condenser 10 when overexcited is controlled or limited by limiting the lagging kva. generated by the condenser while raising the kva. voltage to normal and producing a more leading power factor on the external power supply.

For normal operation, the excitation of the synchronous condenser is dependent upon the operation of the control electromagnet 44 and the anti-hunting electromagnet 50. For such operations, the depending arm 74 of lever 76 seats against the stop 75 to limit the movement of the lever in one direction.

The electromagnet 44 is thus normally energized by a circuit which extends from power conductor 12 through resistor 58 and the energizing winding 54 of the electromagnet to the power conductor 16, the anti-hunting electromagnet 50 being similarly energized by a circuit which extends from the power conductor 12 through resistor 60 and the energizing winding 56 to the power conductor 16. It is evident that the weight 46 can be so adjusted that the magnetic pull of the coil 54 is such as to substantially balance the weight 46 for any given voltage across the conductors, whereby the movable contact member 38 vibrates into and out of engagement with the stationary contact member 36 to effect a regulating action to maintain the required voltage.

As is evident from the drawing, the main winding 70 of the relay 34 is energized at all times by a circuit which extends from the positive terminal of a constant source of power (not shown), through resistors 11 and 13, the winding 70 to the negative terminal of the constant source of power to actuate the relay 34 downwardly against the bias of the spring 68. When thus energized the contact members 32 and 64 of the relay 34 are moved to a circuit opening position. When the movable contact member 38 of the regulator is actuated into engagement with the contact member 36, a circuit is established which may be traced from the positive terminal of a constant source of supply (not shown) through resistors 11 and 15, contact members 38 and 36, neutralizing winding 72 of the relay 34 to the negative terminal of the constant source of power. By energizing the neutralizing coil 72 the magnetic pull of the main winding 70 is so neutralized that the spring 68 associated with the relay 34 biases the relay upwardly to a position where its contact members 32 and 66 are in circuit closing position.

The movement of the contact member 32 to engage the contact members 30 effectively shunts the resistor section 28 from circuit with the field winding 22 of the exciter 20 to increase the energization of the winding and thereby increase its output and effect an increase in the energization of the field winding 18 of the synchronous condenser 10. Thus, the number and duration of the vibrations of the contact member 38 into and out of engagement with the contact member 36 determines the average period of time during which the resistor section 28 is connected in circuit with the field winding 22 of the exciter 20 to control the energization of the field winding 18 of the synchronous condenser 10.

If the voltage of the power circuit 12, 14, and 16 tends to vary from a required value, for example, tends to increase as by reason of a light load, the energization of the winding 54 of electromagnet 44 is increased, effecting an upward movement of the core of the electromagnet to effect a pivotal movement of the lever 42 in a clockwise direction about its pivot to, in effect, move the movable contact member 38 away from the stationary contact member 36. The lengthening of the distance of movement necessary before the contact member 38 engages the contact member 36, in effect, shortens the period of time during which the resistor section 28 is shunted, thereby, in effect, increasing the average amount of resistance in series circuit with the field winding 22 of the exciter 20 to decrease the output of the exciter 20 and effect a decrease in the energization of the field winding 18 of the synchronous condenser. By reducing the energization of the synchronous condenser field, the amount of leading load taken by the condenser is increased, causing the condenser to take a lagging load from the power conductors, thereby preventing a rise in voltage.

At the same time that contact member 32 is in engagement with contact member 30 to shunt the resistor section 28, the contact member 66 of relay 34 is actuated into engagement with the contact member 64 to establish a circuit which may be traced from the power conductor 12 through contact members 64 and 66, resistor section 63 of the resistor 60, and the energizing winding 56 of electromagnet 50 to the power conductor 16 to effect an increase in the energization of the actuating winding of relay 50. The increase in the energization of the actuating winding of relay 50 causes the core member of the electromagnet to move upwardly to permit the bell crank 48 to rotate in a counterclockwise direction about its pivot point, and thereby, in effect, further move the movable contact member 38 away from its cooperating stationary contact member 36 to, in effect, further shorten the period of time in which the resistor section 28 is shunted from the field winding circuit of the exciter 20. The operation of the electromagnet 50 thus gives effective anti-hunting control of the operation of the regulator.

If, on the other hand, the change in the voltage of the power conductors 12, 14, and 16 is a decrease, then the winding 54 of electromagnet 44 is so deenergized that the lever 42 pivots in a counterclockwise direction to move the movable contact member 38 closer to its cooperating stationary contact member 36 whereby the contact members are in engagement for a greater average period of time so that the average amount of resistance connected in circuit with the field winding 22 is thereby decreased to effectively increase the energization of the winding 22 and thereby, in effect, increase the energization of the field winding 18 of the synchronous condenser 10.

If instead of normal loads the load is such that an overexcited condition of the synchronous condenser is encountered, then the electromagnet 78 is energized in accordance with the increase in the kva. of the power conductors. This increase in the energization of the electromagnet 78 effects a counterclockwise movement of the T-shaped lever 76 to actuate the arm 74 away from the stop 75 and to apply a pull to the spring 52, thereby, in effect, moving the lever 42 and the movable contact member 38 carried thereon in a direction away from the fixed contact member 36. As will be apparent, the movement of the contact member 38, in effect, shortens the average period of time in which the contact members 38 and 36 are in engagement and thereby increases the average time in which the resistor section 28 is connected in series circuit with the field winding 22 of the excited. In other words, the average amount of resistance connected in series with the field winding 22 is increased, whereby the energization of the field winding 22 is decreased to effect a decrease in the energization of the field winding 18 of the synchronous condenser 10. Thus, by means of the electromagnet 78, it is possible to provide for limiting the maximum kva. of the power circuit, the limit for which control is provided being determined by the initial balance of the T-shaped lever 76, or, in other words, the balance between the weight carried at one end of the lever 76 and the magnetic lift of the electromagnet 78 at the other end of the lever. By reason of the rectifiers 84 and 90, it is evident that the electromagnet 78 is directly responsive to the kva. of the power circuit, being free of any effects of the phase angle.

In the embodiment of this invention illustrated in Fig. 2, a variable rheostat 92 is connected in circuit with the field winding 18 of the synchronous condenser 10, a motor 94 being provided for adjusting the rheostat 92 through the gear drive 96. As illustrated, the rheostat motor 94 is provided with an armature winding 98 and field windings 100 and 102 disposed to be energized when the relays 104 and 106, respectively, are energized to actuate their contact members 108 and 110, respectively, to a circuit closing position. One end of the energizing windings 112 and 114 of the relays 104 and 106, respectively, is connected to the stationary contact members 116 and 118, respectively, of the regulating apparatus 120, the other end of each of the windings 112 and 114 being connected through a common lead to the negative terminal of a constant source of supply (not shown).

The regulating apparatus 120 comprises electromagnets 122 and 124 acting on the lever 126 which carries contact members 128 and 130, and which is mounted for pivotal movement against the bias of the adjustable spiral spring 132. Each of the electromagnets 122 and 124 is provided with a plurality of windings, the series connected current responsive windings 134 and 136 of the electromagnet 122 being connected in series with the series connected current responsive windings 138 and 140 of the electromagnet 124, while the voltage responsive winding 142 of electromagnet 122 is connected in series circuit with the voltage responsive winding 144 of electromagnet 124. The series connected current responsive windings of the electromagnets 122 and 124 are disposed to be connected through the rectifier 84 to the current transformer 86 connected in circuit relation with the power conductor 12, while the series connected voltage responsive windings of the electromagnets 122 and 124 are connected through the rectifier 90 to the power conductors 12 and 16.

In operation, the spring 132 is adjusted to balance the pull of the electromagnets 122 and 124 for a predetermined kva. The windings of the electromagnets are so wound that when energized the core member of electromagnet 122 tends to move downwardly, whereas the core member of the electromagnet 124 tends to move upwardly, this movement being balanced against the bias of the spring 132. If the system is being operated in conjunction with loads requiring a leading correction factor, then as the kva. of the power circuit varies from the predetermined value which is to be regulated, as, for example, if the kva. increases, each of the electromagnets 122 and 124 is so energized as to actuate the lever 126 against the bias of the spring 132 to effect a counterclockwise pivotal movement of the lever 126 to a position where the movable contact member 128 engages the stationary contact member 116.

The engagement of the contact members 128 and 116 thus establishes a circuit which can be traced from the positive terminal of the constant source of supply (not shown) through the lever 126, contact members 128 and 116, winding 112 of relay 104, to the negative terminal of the constant source of power to energize the winding 112 and actuate the relay to a circuit closing position.

With the relay 104 actuated to its circuit closing position, a circuit is established which extends from the positive terminal of a constant source of supply through the armature winding 98 of the rheostat motor, the field winding 100, contact members 108 of the relay 104 to the negative terminal of the constant source of power to so energize the rheostat motor 94 as to effect its operation to connect additional sections of the rheostat 92 in circuit with the field winding 18 of the synchronous condenser 10 to decrease the energization of the field winding 18.

If, on the other hand, the change in the kva. of the power circuit is a decrease, then the energization of the electromagnets 122 and 124 is so decreased as to effect a clock-wise movement of the lever 126 about its pivot by reason of the spring 132 to actuate the contact member 130 into engagement with the fixed contact member 118. Engagement of the contact members 130 and 118 establishes a circuit which extends from the positive terminal of the constant source of supply through the lever 126, contact members 130 and 118, winding 114 of the relay 106 to the negative terminal of the constant source of supply to so energize the winding 114 as to actuate the contact member 110 of relay 106 to its circuit closing position.

With the contact member 110 of relay 106 in a circuit closing position, a circuit is established extending from the positive terminal of a constant source of supply through the armature winding 98 of the rheostat motor 94, field winding 102, contact member 110 to the negative terminal of the constant source of supply to so energize the motor 94 as to operate the field rheostat 92 to effect a decrease in the number of sections connected in series circuit with the field winding 18 of the synchronous condenser 10, and thereby effect an increase in the energization of the synchronous condenser.

As will be apparent from the foregoing description with respect to Figs. 1 and 2, the system of this invention provides effective control of the operation of a synchronous condenser to maintain substantially constant the kva. of the condenser.

It is, of course, possible that modifications be made in the systems disclosed without detracting from the essence of the invention, and it is, therefore, desired that this invention be not limited to the foregoing description except insofar as is necessitated by the scope of the appended claims.

I claim as my invention:

1. In an electrical system, the combination with a three-phase power circuit, a dynamo-electric machine connected thereto, the dynamo-electric machine having a field winding, a rheostat having a plurality of resistor sections disposed to be connected in circuit relation with the field winding to control the excitation of the dynamo-electric machine, means disposed to control the connections of the resistor sections, an electromagnet having a pair of opposed current responsive windings connected in series circuit relation and a voltage responsive winding disposed therebetween to cooperate in controlling the operation of said control means, and rectifiers connected between the electromagnet and the three-phase power circuit to render the electromagnet responsive to the kilovolt-amperes of the dynamo-electric machine and thereby control the kilovolt-ampere output of the machine.

2. In an electrical system, the combination with a three-phase power circuit, a dynamo-electric machine connected thereto, the dynamo-electric machine having a field winding, a rheostat having a plurality of resistor sections disposed to be connected in circuit relation with the field winding to control the excitation of the dynamo-electric machine, means disposed to control the connections of the resistor sections, a regulator disposed to control the operation of said control means, the regulator including an electromagnet having a pair of opposed current responsive windings connected in series circuit relation and a voltage responsive winding disposed therebetween to cooperate in determining the operation of the regulator, and rectifiers connected in circuit with the windings of the electromagnet and the three-phase power circuit to render the regulator responsive to the kilovolt-amperes of the dynamo-electric machine to so control the operation of the control means as to maintain the kilovolt-ampere output of the dynamo-electric machine substantially constant.

3. In an electrical system, the combination with a three-phase power circuit, a dynamo-electric machine connected thereto, the dynamo-electric machine having a field winding, a rheostat having a plurality of resistor sections disposed to be connected in circuit relation with the field winding to control the excitation of the dynamo-electric machine, means disposed to control the connections of the resistor sections, an electromagnet having a pair of opposed current responsive windings connected in series circuit relation and a voltage responsive winding disposed therebetween to coooperate when energized to control the operation of said control means, and a rectifier connected between each of the current responsive and voltage responsive windings and the three-phase power circuit, the electromagnet thereby being responsive to the kilovolt-amperes of the dynamo-electric machine for controlling the kilovolt-ampere output of the machine.

4. In an electrical system, the combination with a three-phase power circuit, a dynamo-electric machine connected thereto, the dynamo-electric machine having a field winding, a rheostat having a plurality of resistor sections disposed to be connected in circuit relation with the field winding to control the excitation of the dynamo-electric machine, means disposed to control the connections of the resistor sections, a lever disposed for pivotal movement to initiate the operation of the control means, a pair of electromagnets having core members disposed in spaced relation for movement to control the pivotal movement of the lever, current responsive windings disposed on each of the core members connected in series circuit relation, voltage responsive windings disposed on each of the core members connected in series circuit relation, the current and voltage responsive windings being disposed to be energized from the three-phase power source to actuate the core members in opposite directions, and a rectifier connected in each of the current and voltage responsive winding circuits to provide in phase energizing components for each of the electromagnets, the electromagnets thereby being responsive to the kilovolt-amperes of the dynamo-electric machine to maintain the kilovolt-ampere output of the machine substantially constant.

5. In an electrical system, the combination with a three-phase power circuit, a dynamo-electric machine connected thereto, the dynamo-electric machine having a field winding, a rheostat having a plurality of resistor sections disposed to be connected in circuit relation with the field winding to control the excitation of the dynamo-electric machine, and means including electromagnetic means disposed to control the connections of the resistor sections, the electromagnetic means having a pair of opposed current responsive windings connected in series circuit relation and a voltage responsive winding disposed therebetween, and rectifiers connected in circuit between the current responsive windings and the voltage responsive winding of the electromagnetic means and the three-phase circuit, the electromagnetic means thereby being responsive to the kilovolt-amperes of the dynamo-electric machine to control the connections of the resistor sections and thereby control the kilovolt-ampere output of the dynamo-electric machine.

RALPH A. GEISELMAN.